(12) United States Patent
Taguchi

(10) Patent No.: US 9,036,907 B2
(45) Date of Patent: May 19, 2015

(54) METHOD AND APPARATUS FOR EXTRACTING DEPTH EDGES FROM IMAGES ACQUIRED OF SCENES BY CAMERAS WITH RING FLASHES FORMING HUE CIRCLES

(75) Inventor: Yuichi Taguchi, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 25 days.

(21) Appl. No.: 13/549,791

(22) Filed: Jul. 16, 2012

(65) Prior Publication Data

US 2014/0016862 A1 Jan. 16, 2014

(51) Int. Cl.
*G06K 9/00* (2006.01)
*G06T 7/00* (2006.01)

(52) U.S. Cl.
CPC ..... *G06T 7/0073* (2013.01); *G06T 2207/10024* (2013.01); *G06T 2207/10152* (2013.01)

(58) Field of Classification Search
None
See application file for complete search history.

(56) References Cited

U.S. PATENT DOCUMENTS

| | | | | |
|---|---|---|---|---|
| 7,574,067 | B2 * | 8/2009 | Tu et al. | 382/254 |
| 7,738,725 | B2 | 6/2010 | Raskar | |
| 8,212,857 | B2 * | 7/2012 | Keam | 348/31 |
| 8,743,426 | B2 * | 6/2014 | Cook et al. | 358/3.27 |
| 2004/0184653 | A1 | 9/2004 | Baer et al. | |
| 2004/0212725 | A1 * | 10/2004 | Raskar | 348/370 |
| 2005/0254720 | A1 * | 11/2005 | Tan et al. | 382/254 |
| 2007/0025717 | A1 * | 2/2007 | Raskar et al. | 396/155 |
| 2009/0122058 | A1 * | 5/2009 | Tschesnok | 345/420 |
| 2009/0297020 | A1 * | 12/2009 | Beardsley et al. | 382/154 |
| 2010/0097495 | A1 * | 4/2010 | Choe et al. | 348/235 |
| 2011/0081087 | A1 * | 4/2011 | Moore | 382/199 |
| 2011/0122432 | A1 * | 5/2011 | Do et al. | 358/1.15 |
| 2011/0157178 | A1 * | 6/2011 | Tuzel et al. | 345/426 |

OTHER PUBLICATIONS

Ushio America, Inc. "Popstar MR-16—Halogen Reflectors," Web Archive, Jun. 30, 2007, <http://ushio.com/products/generallighting/hr-popstar.htm>.*
Ushio America, Inc. "Whitestar MR-16—Halogen Reflectors," Web Archive, Jun. 30, 2007, <http://ushio.com/products/generallighting/hr-whitestar.htm>.*
Rogerio Feris et al. "Dealing with Multi-Scale Depth Changes and Motion in Depth Edge Detection," TR-2006-110 Oct. 2006 Mitsubishi Electric Research Laboratories http://www.merl.com SIBGRAPI 2006 Brazilian Symposium on Computer Graphics and Image Processing.

(Continued)

*Primary Examiner* — Vu Le
*Assistant Examiner* — Samah Beg
(74) *Attorney, Agent, or Firm* — Dirk Brinkman; Gene Vinokur

(57) ABSTRACT

A set of images is acquired of a scene while illuminating the scene with a set of colors with different hues. The set of colors is generated by a set of light sources arranged in a substantial circular manner around a lens of a camera to form a hue circle, wherein each light source emits a different color. A shadow confidence map is generated from the set of images by using hues and saturations of pixels in the set of images. Then, depth edges are extracted from the shadow confidence map.

16 Claims, 5 Drawing Sheets

(56) References Cited

OTHER PUBLICATIONS

Taguchi et al.: "Rainbow Flash Camera: Depth Edge Extraction using Complementary Colors," Oct. 7, 2012, Computer Vision ECCV 2012, Springer Berlin Heidelberg, Berlin, Heidelberg. pp. 513-527. XP047019106.

Rogerio Feris et al.: "Dealing with Multi-scale Depth Changes and Motion in Depth Edge Detection," Computer Graphics and Image Processing, 2006. Sibgraph '06 19th Brazilian Symposium ON, IEEE, PI. Oct. 1, 2006, pp. 3-10. XP031035988.

* cited by examiner

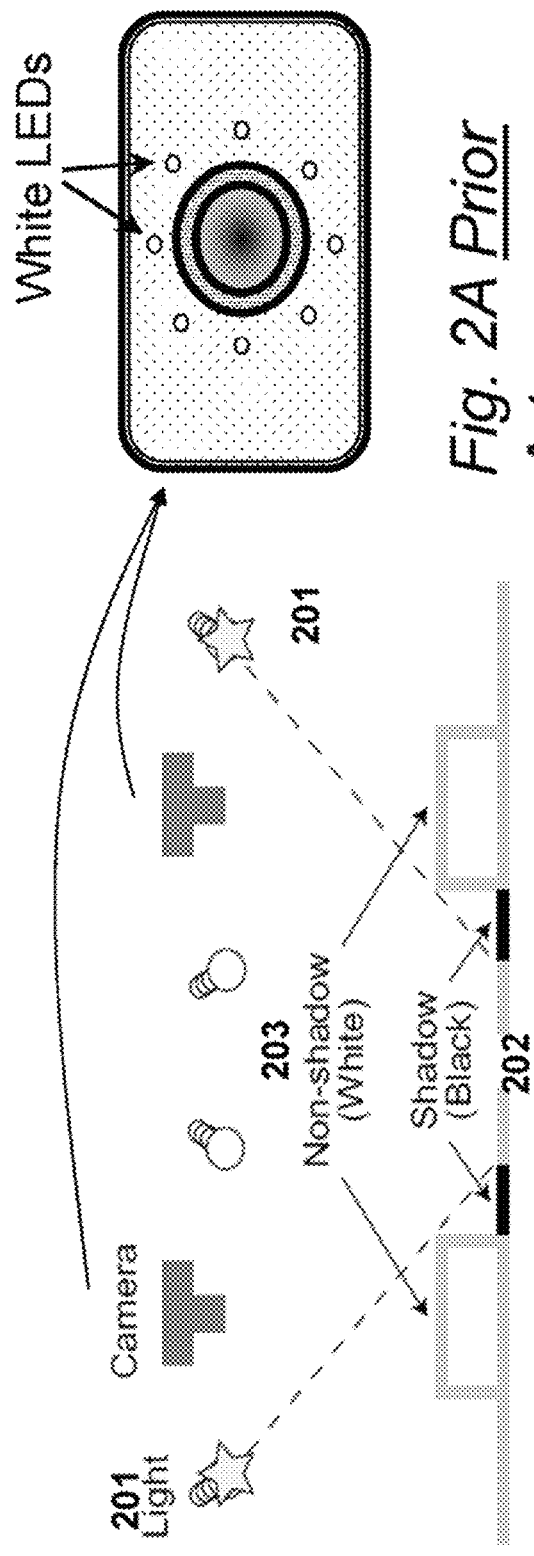
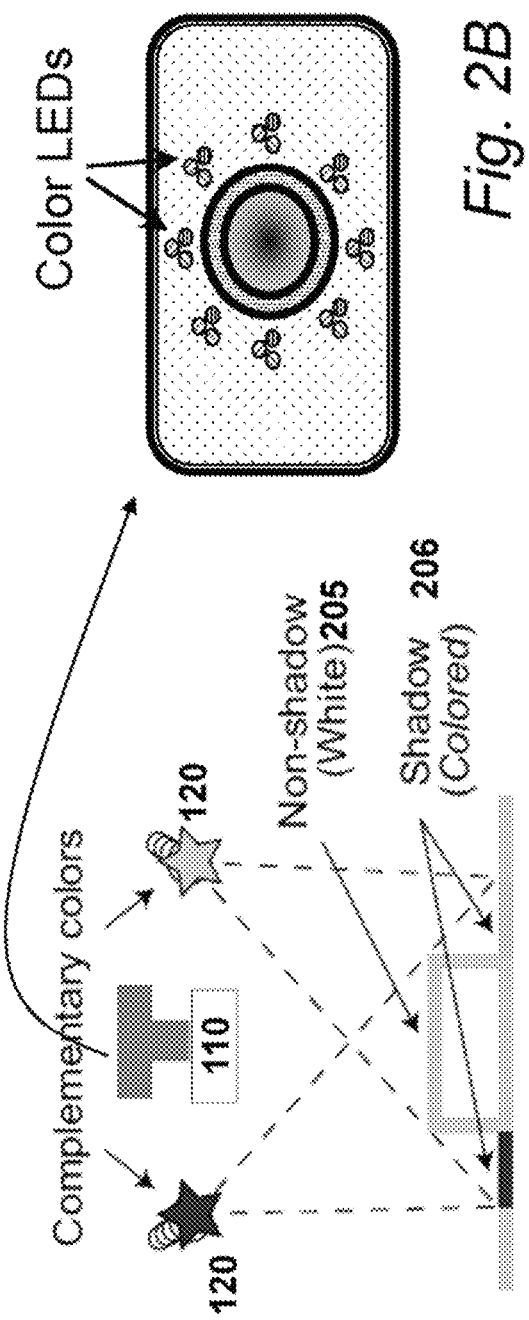

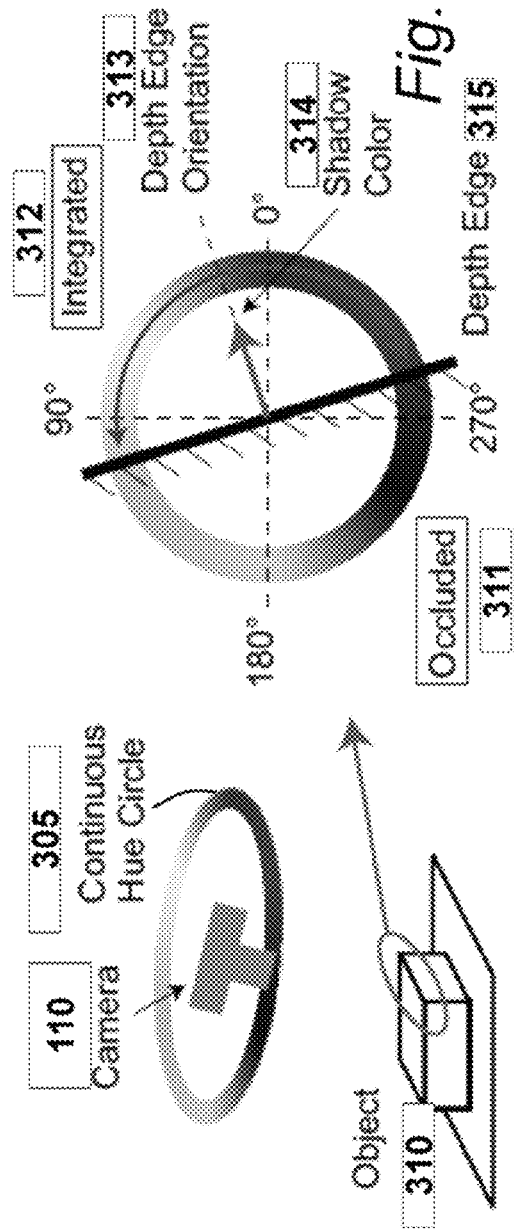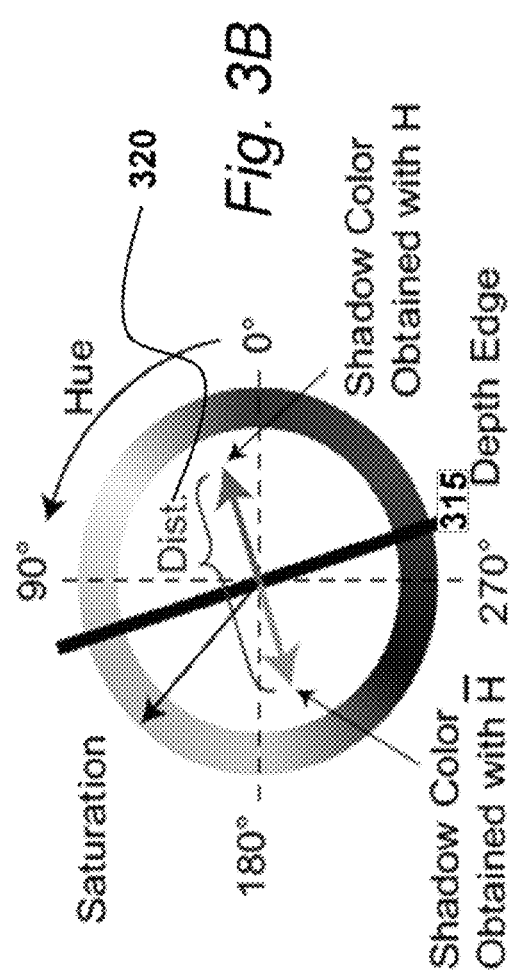
Fig. 3A
Fig. 3B

METHOD AND APPARATUS FOR EXTRACTING DEPTH EDGES FROM IMAGES ACQUIRED OF SCENES BY CAMERAS WITH RING FLASHES FORMING HUE CIRCLES

FIELD OF THE INVENTION

This invention relates generally to extracting depth edges from images, and more particularly to acquiring the images with multiple flashing colored light sources.

BACKGROUND OF THE INVENTION

Discontinuities, such as depth edges, in a scene play a key role in various computer vision applications such as segmentation, object detection, and pose estimation. Using a single 2D image, it is difficult to distinguish depth edges or discontinuities from intensity edges.

In U.S. Pat. No. 7,738,725, Raskar et al. describe a multi-flash camera (MFC) for extracting depth edges by casting shadows from different light positions for non-photorealistic rendering. Depth edges extracted using the MFC have been also used for silhouette-based 3D reconstruction, depth-edge-preserving stereo matching, and object detection and pose estimation in robotic and other industrial applications. All of those cameras and methods acquire multiple images by using one flash at a time for each image.

Feris et al. describe a color multiplexed MFC using (three) distinct red, green, and blue light sources for depth edge extraction. Because that method encodes shadows from the three distinct light sources separately into each RGB channel of the camera, it is only applicable to three light source positions. In addition, that method also requires a reference image acquired with white light sources. The method takes a ratio of the colored channels and the white light images.

Another method that uses a single image for depth edge extraction is based on frequency multiplexing. That method projects multiple sinusoidal patterns such that the frequencies are maintained independent of the scene geometry, and then performs frequency demultiplexing to detect shadow regions or to recover individually illuminated images. That method requires multiple projectors as light sources. That method also sacrifices spatial resolution due to frequency computation in local neighborhoods.

Illumination Multiplexing

Illumination multiplexing has been used for various active illumination applications, including photometric stereo, structured light, image-based relighting, and object material segmentation. The multiplexing is performed using conventional three red-green-blue (RGB) color channels. More channels can also be used for multispectral cameras and illuminations to reduce the number of acquired images. Multiplexing can also improve the signal-to-noise ratio using the same number of acquired images. With color and time multiplexing, at least (n+2)/3 images are required to demultiplex n light sources. The goal of those methods is to demultiplex acquired images to obtain multiple images as if the scene was illuminated by individual light sources.

Complementary Colors

Complementary colors can be used to obtain object material colors in active illumination systems. One method acquires two consecutive images by using complementary colors for each projector pixel, or each light source. The two images are added to simulate the case as if the scene was illuminated by white light sources.

Another system projects two images from two projectors such that the images have pixel-wise complementary colors on a plane. That system can be used for artistic visualization to colorize the shadow of a user interacting with the system.

SUMMARY OF THE INVENTION

The embodiments of the invention provide a method and apparatus for extracting depth edges in a scene using images acquired of the scene by novel color multiplexing with multiple light sources.

The light sources form a colored ring arranged around a lens of a camera. The colors correspond to a hue circle. Because complementary colors are located at any position and its antipole in the hue circle, shadow regions, where a half of the hue circle is occluded, are colorized according to the orientation of depth edges, while non-shadow regions, where all the hues are mixed, have a neutral color in the acquired image.

The colored shadows in a single image directly provide depth edges and their orientations. We perform accurate depth edge extraction using an additional image acquired by rotating the hue circle by 180° and acquiring a second image.

BRIEF DESCRIPTION OF THE DRAWINGS

FIG. 2A is a schematic of a 2D slice of a conventional method for extracting depth edges using multiple while light sources, one at a time, and acquiring multiple images;

FIG. 2B is a schematic of a 2D slice of a method for extracting depth edges using a colored ring light source and acquiring a single image according to embodiments of the invention;

FIG. 3A is a schematic of depth edge extraction from a single image using a ring light source having a continuous hue circle according to embodiments of the invention;

FIG. 3B is a schematic of depth edge extraction from two images using a ring light source having a continuous hue circle according to embodiments of the invention;

DETAILED DESCRIPTION OF THE PREFERRED EMBODIMENTS

The embodiments of the invention provide a method and apparatus for extracting depth edges using a set of images acquired of a scene by novel color multiplexing of light sources. The method can be performed in a processor 101 connected to memory and input/output interfaces as known in the art. The processor can be part of the camera, or externally located. The processor can include means for performing the steps, such as software, firmware, or other hardware components.

Figure 1:
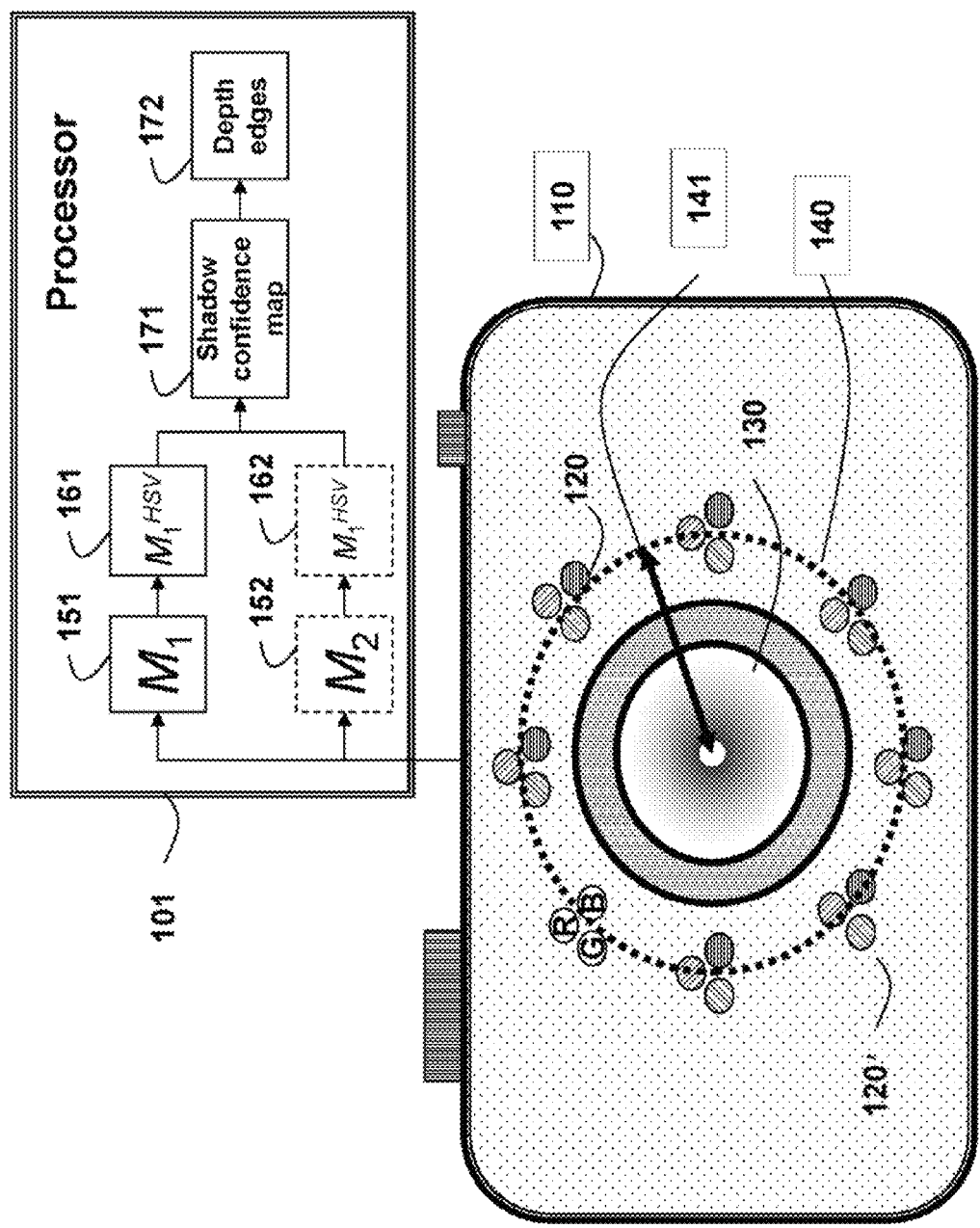
FIG. 1 is a front-view schematic of an apparatus and method for extracting depth edges according to embodiments of the invention.

FIG. 1 shows a camera 110 used to acquire a set of images of a scene for depth edge extraction according to embodiments of the invention. As described herein, the set can include one, two, or more images.

The light sources are in the form of, e.g., eight sets of three RGB light emitting diodes (LEDs) 120, that are arranged around the lens 130 of the camera in a substantially circular pattern 140. It should be understood that the light sources can be in other forms, e.g., eight sets of broad-spectrum (white) light sources with different color filters. It should be also understood that sets of other sizes can be used.

The light sources produce colors corresponding to a hue circle, i.e., the colors substantially span a continuous spectrum from 0° to 360° of the hues. In the hue circle, complementary colors are located at any position and its antipole. For example, light sources 102 and 102' have complementary colors. The number of light sources used determines the accuracy of detecting the orientation of the depth edges: Increasing the number of light sources increases the accuracy of the orientation. In the preferred embodiment, the light sources are arranged in the circular pattern uniformly. The radial distance 141 of the light sources from the optical axis of the lens can vary. Increasing the distance widens the shadow regions. However, the distance should not be so large that the shadow detaches from the actual depth edge for objects that are not directly on a background.

Instead of flashing a single light source at a time as in conventional methods and apparatuses, the embodiments flash all light sources simultaneously for each image to reduce the number of images to be acquired. A first image $M_1$ 151 is acquired by using colors corresponding to an arbitrary hue circle. A second image $M_2$ 152 can be optionally acquired by rotating the hue circle by 180°.

Image regions that are occluded from at least one of the discrete light sources, or a part of a continuous light source are referred to as shadow regions. Regions illuminated by all light sources are referred to as non-shadow regions.

In each of the acquired images, shadow regions are colorized with different hues because a half of the hue circle is occluded, while non-shadow regions have a neutral color because the entire hue circle is mixed. Thus, to identify shadow regions, a shadow confidence map 171 can be generated by analyzing the hue, saturation, and value representation, $M_1^{HSV}$ 161 and $M_2^{HSV}$ of the acquired images, $M_1$ 151 and $M_2$ 152. Note that the colors of the shadow regions directly provide the orientations of the corresponding depth edges. Depth edges 172 with orientations are obtained from the shadow confidence map by analyzing boundaries between shadow and non-shadow regions for each light source.

Principle in 2D

First, the depth edge extraction in 2D using two light sources is described. Assume that there is no ambient light, and the scene is illuminated by a neutral (white) color. It is also assumed that the scene is Lambertian so that scattered light has the same apparent brightness regardless of the angle of view. The light sources are located sufficiently far from the scene to illuminate the scene uniformly, and the colors are uniformly blended on surfaces of objects.

FIGS. 2A-2B show depth edge extraction in 2D using two light sources. As shown in FIG. 2A, a conventional method flashes a single white light source 201 at a time and acquires an image for each flash. Shadow regions appear black, while non-shadow regions appear white, in each image. Depth edges are extracted as boundaries between shadow (black) 202 and non-shadow (white) regions 203. There are two such boundaries in this scene, corresponding to a depth edge (depth discontinuity) and a shadow edge (boundary between shadow and non-shadow regions on the same plane). The edges can be distinguished by locating white-to-black transitions in the acquired image along an epipolar line defined by the light source position.

In contrast, the method shown in FIG. 2B uses complementary colors and acquires a single image by simultaneously flashing all color light sources at the same time. Because the mixture of complementary colors in an additive color system results in a neutral (white) color, non-shadow regions 205, illuminated by the two light sources, appear white in the acquired image. On the other hand, shadow regions 206, illuminated by only a single light source due to occlusion, are colorized with the colors of the light sources. Note that the color of the shadow indicates the orientation of the associated depth edge.

Principle in 3D

Here, the depth edge extraction in 3D is described. A conventional MFC places N (typically 2, 4, or 8) white light sources around the camera, acquires N images by flashing a single light source at a time for each of the N flashes, and extracts depth edges corresponding to N orientations from each of the acquired image.

Instead of using discrete light sources, I build my theory on light sources that emit a continous spectrum of a hue circle. Consider a ring light source around the lens of the camera 110 that realizes a continuous, maximally saturated hue circle with the same brightness 305, as shown in FIG. 3A.

A single image is acquired by flashing the entire continuous light source including different hues. In the shadow region corresponding to a straight depth edge 315 of an object 310, a half of the hue circle is occluded 311 by the object 310, while the other half is integrated 312 in the shadow region. For curved depth edges, the tangent line at each depth edge pixel is considered.

The additive mixture of any number of colors is determined as the weighted average of the positions of the original colors in the hue-saturation plane, referred to as Newton's geometrical weighting. The brightness of each original color corresponds to the weight. Thus, the mixture of colors in the half of the hue circle results in a color that has the hue at the center of the half circle and is slightly unsaturated (called saturation cost). As a consequence, shadow regions in the single acquired image are colorized 314 according to the orientations 313 of the corresponding depth edges 315. In non-shadow regions, all colors in the hue ring are mixed, producing a neutral (white) color.

In an ideal situation, the method can detect shadow regions and corresponding depth edges, as well as distinguish all possible depth edge orientations, from a single acquired image by analyzing the hues in the image as described above.

In contrast, conventional methods require more images to detect and distinguish more depth edge orientations. It is known that three light source positions are sufficient to cast shadows for all depth edges in a general scene. However, this does not provide precise depth edge orientations. To obtain precise orientations with a conventional MFC, the optimal light position at which the shadow region has the maximum response for each depth edge point needs to be known.

Depth Edge Extraction Using Two Images

In practice, object colors and ambient lights in the scene are typically unknown, which makes depth edge extraction using a single image suboptimal.

To improve the accuracy and robustness, two images are acquired: $M_1$ by using a hue circle H, as described above, and $M_2$ by rotating the hue circle by 180°, i.e., using the complementary version $\bar{H}$ of the hue circle H.

As shown in FIG. 3B, the color of a shadow region obtained with H and the color of the same shadow region obtained with $\bar{H}$ become complementary, i.e., the distance (Dist.) 320 between the two colors on the hue-saturation plane is maximized. I use this distance as a confidence value to detect shadow regions using the two images.

Instead of acquiring the second image with $\overline{H}$, I could acquire an ambient image with no light source on, or an image with all light sources on. However, that produces neutral color illuminations, corresponding to the center of the hue-saturation plane. Thus, the distance measure becomes less reliable. Any other rotation of the original hue circle H also produces a less reliable distance measure, because it makes the angle between the two shadow colors less than 180°, while the saturations of the shadow colors are always the same due to the integration of a half circle.

Apparatus

As shown in FIG. 1, my camera 110 has a conventional digital camera body, sensor, shutter, and optics. The lens is surrounded by eight color light sources. Each color light source is composed of three LEDs of red-green-blue (RGB) components. Brightness of the individual RGB components is controlled by pulse-width modulation (PWM) using a microcontroller, for example, the microcontroller used to operate the camera. All LEDs are synchronized with the camera via a shutter trigger signal to the controller. Each light source can emit any color in the spectrum as a combination of the RGB LEDs, and the colors can be different by controlling the PWM.

Color Calibration

I measure response functions for the RGB LEDs by changing the duty cycle of the PWM signal. I assume that the eight RGB LEDs have the same response function for each color channel. I acquire multiple images by flashing a single R, G, or B LED of all the eight color light sources simultaneously with different duty cycles.

Figures 4A, 4B, 4C:
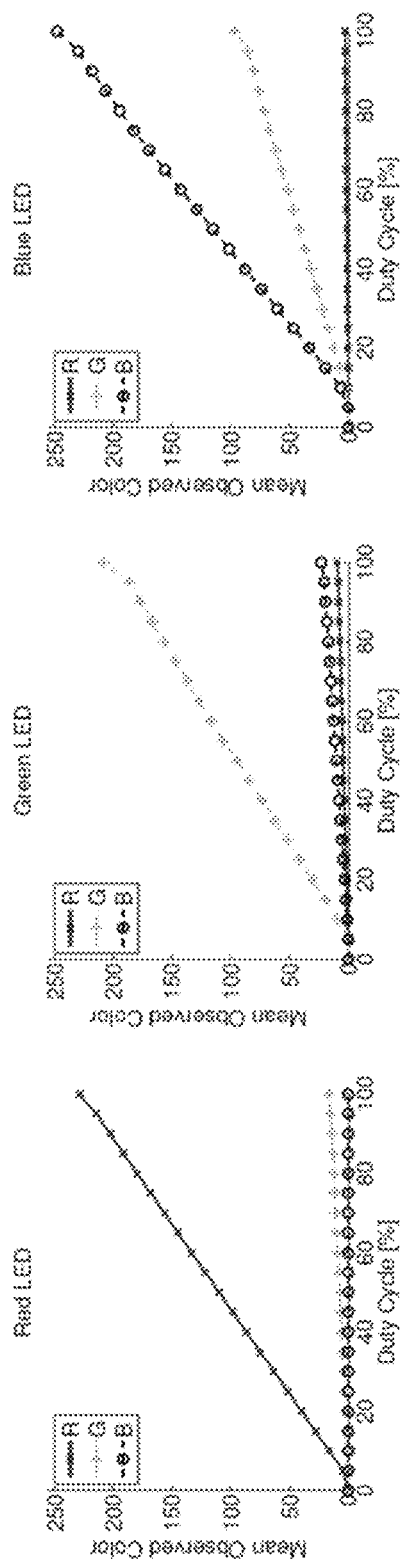
FIGS. 4A-4C are graphs of colors acquired by a camera as a function of duty cycle for each RGB light emitting diode (LED)

FIGS. 4A-4C show the mean observed colors acquired by the camera as a function of the duty cycle for each RGB LED.

The camera has an approximately linear response functions with some color cross talks. To obtain a desired color ($r_0$, $g_0$, $b_0$) for each color light source, a linear function is fitted to each response function and the duty cycles required for each RGB LED is determined by solving a linear least square problem.

Detailed Method Steps

Figure 5:
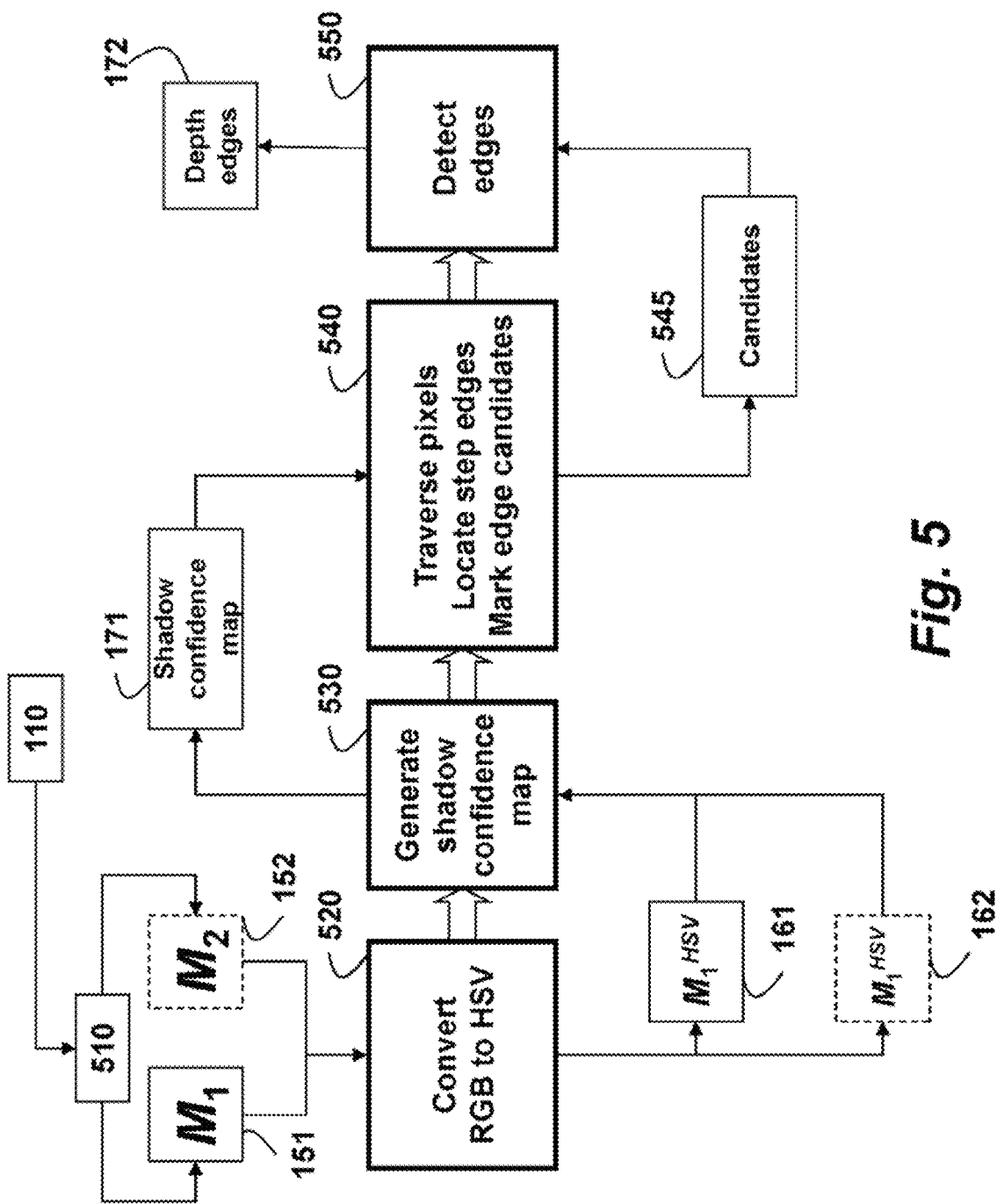
FIG. 5 is a flow diagram of a method for extracting depth edges from one or two images according to embodiments of the invenetion.

FIG. 5 shows the detailed steps of the depth edge extraction method for one or two images. I describe the method for a single image, and then for two images. For the single image method, I use a discrete set of hues $$H_d = \left\{ \frac{360°}{N} \times i \,\middle|\, i = 0, \ldots, N-1 \right\}$$

with an identical saturation to approximate a continuous hue circle H using N discrete light sources. In the preferred embodiment, N=8 and the saturation is a maximum value (one). For a two image method, I also use a discrete set of complementary hues $$\overline{H}_d = \left\{ 180° + \frac{360°}{N} \times i (\mathrm{mod} 360°) \,\middle|\, i = 0, \ldots, N-1 \right\}$$

with an identical saturation to approximate the complementary version $\overline{H}$ of the continuous hue circle H.

An identical brightness (value) is used for the eight HSV colors, such that the maximal RGB values are within a maximal duty cycle obtained by the color calibration process. HSV stands for hue, saturation, and value, and is also often called HSB (B for brightness). HSV is common cylindrical-coordinate representations of points in an RGB color model, which rearrange the geometry of RGB to be more intuitive and perceptually relevant than a Cartesian cube representation. Other color spaces can be used to generate colors using the sets of hues, as well as to determine the hues and saturations in the acquired images in the depth edge extraction method described below.

Single Image

Step 1. With the camera 110, acquire 510 one images $M_1$ 151 with the hue set $H_d$.

Step 2. Convert 520 $M_1$ into the HSV color space as $M_1^{HSV}$ 161.

Step 3. For each pixel, determine a saturation component of $M_1^{HSV}$ 161 to generate 530 the shadow confidence map 171.

Step 4. In the shadow confidence map, for each of the eight light sources perform the following steps 540. (a) Traverse pixels along the epipolar line corresponding to the position of the light source. (b) Locate step edges with negative transitions of the shadow confidence values. (c) For each pixel x corresponding to a step edge, if the hue $M_1^{HSV}(x)$ is within a predetermined threshold of the hue of the target light source, then mark the pixel x as a depth edge candidate pixel 545.

Step 5. For the depth edge candidates 545, perform connected-component analysis and hysteresis thresholding, similar to the Canny edge detector to detect 550 the depth edges 172.

Two Images

Step 1. With the camera 110, acquire 510 two images $M_1$ 151 and $M_2$ 152 with the hue sets $H_d$ and $\overline{H}_d$, respectively.

Step 2. Convert 520 $M_1$ and $M_2$ into the HSV color space as $M_1^{HSV}$ 161 and $M_2^{HSV}$ 162.

Step 3. For each pixel, determine a distance between $M_1^{HSV}$ and $M_2^{HSV}$ on the hue-saturation plane to generate 530 the shadow confidence map 171.

Step 4. In the shadow confidence map, for each of the eight light sources perform the following steps 540. (a) Traverse pixels along the epipolar line corresponding to the position of the light source. (b) Locate step edges with negative transitions of the shadow confidence values. (c) For each pixel x corresponding to a step edge, if the hues $M_1^{HSV}(x)$ and $M_2^{HSV}(x)$ are within a predetermined threshold of the hues of the target light sources, then mark the pixel x as a depth edge candidate pixel 545.

Step 5. For the depth edge candidates 545, perform connected-component analysis and hysteresis thresholding, similar to the Canny edge detector to detect 550 the depth edges 172.

For Steps 4a and 4b, a 3×3 Sobel filter with a direction aligned along the epipolar line corresponding to the position of the light source is used. I also use non-maximal suppression for each direction to obtain thin edges that better localize the depth discontinuities.

Step 4c is used because the negative transitions could be a shadow edge of an antipodal light source. Suppose a red and a cyan light source are placed in the left and right of the lens of the camera, respectively. When the method traverses a row of the acquired image from left to right to locate depth edges for the red light source, then there are two negative transitions; one is a depth edge for the red light source, and the other is a shadow edge for the cyan light source.

The obtained depth edges can be used in several computer vision, computer graphics, and robotics applications, including segmentation, 3D reconstruction, object detection/recognition, pose estimation, and non-photorealistic rendering.

Evaluation

The method evaluation is performed under various conditions by comparing it with a conventional MFC approach.

To obtain conventional MFC images, all RGB LEDs of a color light source are turned on to produce a white light source and acquired N flash images, $I_1, \ldots, I_N$. The conventional approach also requires one ambient image, $I_{N+1}$, to compensate for object colors and ambient lights.

To obtain depth edges, the following steps are performed:

Step 1. Subtract the ambient image from flash images:

$$I_i^s = I_i - I_{N+1} (i=1, \ldots, N).$$

Step 2. Determine a pixel-wise maximum image, $I_{max}(x) = \max_i(I_i^s(x))$ to generate a shadow-free image.

Step 3. Generate a ratio image for each flash position:

$$R_i(x) = I_i^s(x) / I_{max}(x).$$

The ratio images $R_i$ act as shadow confident maps for each light source position in the conventional approach. Conventional depth edges are generated by applying the same edge detection method used in my method (Steps 4 and 5), except the color check process (Step 4c), to the ratio images. The conventional method also extracts depth edges with N orientations. The conventional method requires N+1 images, while my method only uses one or two images, independent of the number of flashes.

Specular Highlights

If there are strong specular highlights, then the assumption that all the hues are mixed in non-shadow regions is violated. This also violates the assumption in conventional methods that non-shadow regions have similar appearance in all the acquired images. Conventional methods can use the fact that specular highlights change their positions in the acquired images, because each image is acquired with a single light source at a different position. Instead of using a pixel-wise maximal value to determine the shadow-free image, the median intensity or median of gradients at each pixel can be used to remove the effect of specular highlights in conventional methods. My method uses all the flashes simultaneously, thus producing specular highlights at fixed positions in the two acquired images. This may cause false depth edge artifacts.

Semi-Specular Surfaces

For semi-specular object surfaces, the hues in non-shadow regions (object surfaces) change in the two acquired images because of specular reflections. Such object surfaces also increase the dynamic range of the scene: Depending on the normals of the surfaces, some regions reflect a large amount of light and become bright, while other regions remain dark. Both of these too bright or dark regions lead to low-saturation colors that are close to the center of the hue-saturation plane, where the estimation of the hue becomes unstable.

By only using the absolute difference of the hues, the shadow confidence map is unstable for such regions. The shadow confidence map defined by the distance on the hue-saturation plane provides a more accurate measure.

Effect of the Invention

The embodiments provide a novel color multiplexing method for depth edge extraction that exploits the complementary nature of a hue circle. The method colorizes shadow regions in acquired images because of the occlusion of a half of the colors in the hue circle, while letting non-shadow regions have a neutral color because of the mixture of all the colors in the hue circle. Although a simple way to extract depth edges with orientations is provided by analyzing the hues in a single image, in practice, I provide a more accurate depth edge extraction method that acquires two images using a hue circle and its 180° rotated version.

More images can be acquired by using differently rotated hue circles, by turning all light sources on, or by turning all light sources off, which could further improve depth edges, while sacrificing capture and processing time.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for extracting depth edges from a set of images, comprising the steps of:
   acquiring the set of images of a scene while illuminating the scene with a set of colors, wherein the set of colors is generated by a set of light sources arranged in a single circle around a lens of a camera, wherein complementary colors of the light sources are located at any position and an antipode of the position so that the set of colors correspond to a continuous hue circle, and wherein each light source includes a red, green and blue light emitting diode (LED);
   generating a shadow confidence map from the set of images by using hues and saturations of pixels in the set of images; and
   extracting depth edges from the shadow confidence map.

2. The method of claim 1, further comprising:
   determining orientations of the depth edges according to the hues of the pixels on the depth edges.

3. The method of claim 1, wherein the set of light sources illuminates the scene simultaneously.

4. The method of claim 1, wherein shadow regions in the scene have colors corresponding to the set of light sources, and non-shadow regions have a neutral color.

5. The method of claim 4, wherein, at the depth edge, the hues of a half of the hue circle are occluded and the hues of another half of the hue circle are integrated in the shadow region.

6. The method of claim 1, wherein each light source includes a color filter and a broad-spectrum light source.

7. The method of claim 1, wherein the colors of the set of light sources are $$H_d = \left\{ \frac{360°}{N} \times i \mid i = 0, \ldots, N-1 \right\},$$

wherein N is a number of the light sources, and the light sources have an identical saturation and brightness.

8. The method of claim 1, wherein the extracting further comprises:
   traversing the pixels along an epipolar line corresponding to a position of each light source;
   locating step edges with negative transitions of values in the shadow confidence map;
   marking a step edge as a depth edge candidate if the hues of pixels in the set of images corresponding to the step edge are within a predetermined threshold of the target light sources; and
   applying connected-component analysis and hysteresis thresholding to the depth edge candidates to extract the depth edges.

9. The method of claim 8, wherein the locating uses a Sobel filter with a direction aligned along the epipolar line.

10. The method of claim 1, wherein the generating further comprises:
converting a single image in the set of images into an HSV color space; and
determining a shadow confidence value for each pixel as the saturation of the pixel.

11. The method of claim 1, wherein the set of images includes a first image acquired by using the set of light sources corresponding to the hue circle and a second image acquired by rotating the hue circle by 180°, and generating the shadow confidence map using the two images.

12. The method of claim 11, wherein the generating further comprises:
converting the first and second images into an HSV color space; and
determining a shadow confidence value for each pixel as a distance on a hue-saturation plane between the pixel in the first image and the pixel in the second image.

13. The method of claim 11, wherein hues of the light sources for the first image are $$H_d = \left\{ \frac{360°}{N} \times i \,\middle|\, i = 0, \ldots, N-1 \right\},$$

and hues of the light sources for the second image are $$\overline{H}_d = \left\{ 180° + \frac{360°}{N} \times i (\bmod 360°) \,\middle|\, i = 0, \ldots, N-1 \right\}$$

wherein N is a number of the light sources, and the light sources have an identical saturation and brightness.

14. An apparatus for extracting depth edges from a set of images, comprising:
a camera including a set of light sources arranged in a single circle around a lens of the camera, wherein each light source emits a different color, and wherein the camera acquires the set of images of a scene while illuminating the scene with a set of colors, wherein complementary colors of the light sources are located at any position and an antipode of the position so that the set of colors correspond to a continuous hue circle, and wherein each light source includes a red, green and blue light emitting diode (LED); and
a processor configured to generate a shadow confidence map from the set of images by using hues and saturations of pixels in the set of images, and to extract the depth edges from the shadow confidence map.

15. The apparatus of claim 14, wherein the processor is configured to convert the image into an HSV color space, and to determine a shadow confidence value for each pixel as the saturation of the pixel.

16. The apparatus of claim 14, wherein the set of images includes a first image and a second image, and the camera acquires the first image while illuminating the scene with the set of light sources corresponding to the hue circle and a second image acquired by rotating the hue circle by 180°, and wherein the processor converts the first and second images into an HSV color space to determine a shadow confidence value for each pixel as a distance on a hue-saturation plane between the pixel in the first image and the pixel in the second image.

* * * * *